United States Patent [19]

Rosman

[11] Patent Number: 5,042,365
[45] Date of Patent: Aug. 27, 1991

[54] ANNULAR PRELOADED SEAL FOR A SLIDING PISTON IN CYLINDRICAL TANK

[75] Inventor: Irwin E. Rosman, Woodland Hills, Calif.

[73] Assignee: Rockwell International Corporation, El Segundo, Calif.

[21] Appl. No.: 523,479

[22] Filed: Aug. 15, 1983

[51] Int. Cl.[5] .................................................. F16J 1/06
[52] U.S. Cl. ......................................... 92/192; 92/194; 60/39.48; 277/103
[58] Field of Search ...................... 92/165 R, 170, 192, 92/208, 209, 194, 195, 192, 168, 212, 227, 246; 102/381; 277/103; 60/39.48, 259, 633, 636; 222/389, 394, 399

[56] References Cited

U.S. PATENT DOCUMENTS

| | | | |
|---|---|---|---|
| 1,224,999 | 5/1917 | Barthel | 92/192 |
| 2,430,492 | 11/1947 | Carlson | 92/194 |
| 2,992,052 | 7/1961 | De John | 92/194 |
| 3,545,343 | 12/1970 | Orbeck | 60/39.48 |
| 3,680,310 | 8/1972 | Arvidson | 102/381 |
| 4,074,527 | 2/1978 | Sadler | 60/39.48 |

Primary Examiner—Harold J. Tudor
Attorney, Agent, or Firm—H. Fredrick Hamann; Harry B. Field; Lawrence N. Ginsberg

[57] ABSTRACT

A peripheral sliding seal for sealing the liquid propellant in a cylindrical tank 10 containing a piston 14 for positive expulsion of the liquid propellant. The seal comprises a peripheral inward flange member 16 around the piston periphery adjacent the inner wall of the tank, an annular pressure ring 18 bonded to the flange member 16 and forming several recesses therewith, one recess containing a compliant sealing ring 20 and the other containing a shear seal 32 bonded both to the fringe member 16 and to the entrance head 12 of the tank. The bonds prevent internal and external leakage of the liquid fuel during storage. Pressurization of the piston 14 permits the piston 14 to move and breaks the shear seal 32. The compliant-ring seal slides with the piston 14, the compliant ring 20 being pressed against the inner wall of the tank by resilient fingers 34 of the pressure ring 18 to form a sliding seal.

25 Claims, 2 Drawing Sheets

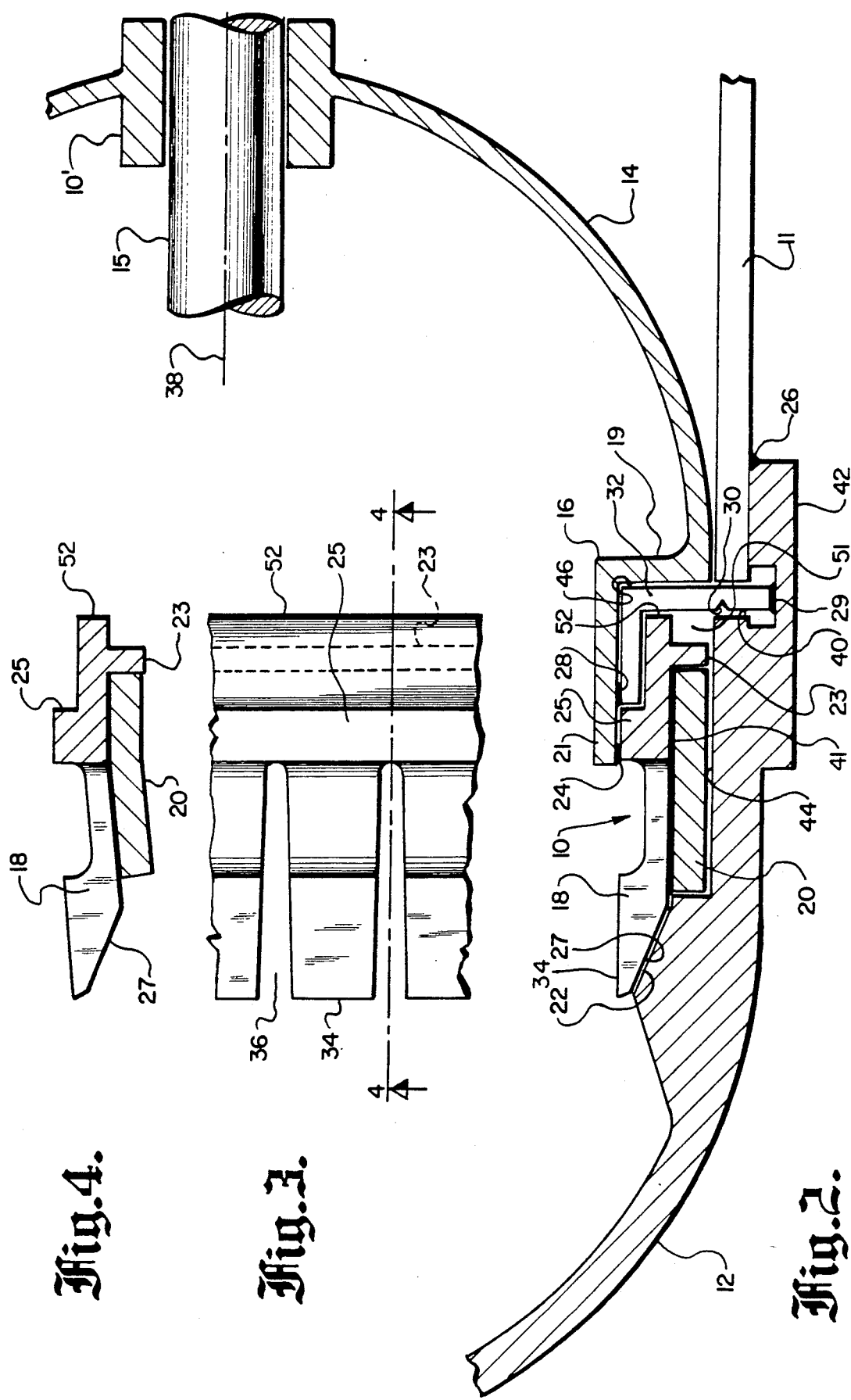

ANNULAR PRELOADED SEAL FOR A SLIDING PISTON IN CYLINDRICAL TANK

BACKGROUND OF THE INVENTION

1. Field of the Invention

This invention relates to an annular seal, and especially to a preloaded circumferential sliding seal for use on a piston in a rocket propellant tank.

2. Description of the Prior Art

One of the main sources of fuel for the energization of rocket engines is liquid propellant fuel. The liquid propellant is stored in a tank, often cylindrical in shape, within the rocket engine. To avoid the problems which occur when positive expulsion of the liquid fuel is not achieved, pistons are often provided within the tanks to maintain a constant pressure against the liquid propellant and force the propellant into the tank outlet during operation of the engine.

However, to prevent leakage of the liquid propellant past the piston into the rear section of the tank, which may house a gas generator of the solid propellant type, for example, whose materials may be incompatible with the liquid propellant, it is necessary to seal the areas where the piston meets the body of the tank or the central shaft which is often used in the tank to stabilize the orientation of the piston.

It is also important to provide a seal which will provide for long-term sealing of the propellant, since the rocket may be stored for many years before being used.

SUMMARY OF THE INVENTION

The invention comprises a circumferential sliding seal which operates to seal a moving part, such as a piston, which moves within an encircling cylinder, such as a cylindrical tank used to hold liquid propellant fuel for a rocket engine. The periphery of the piston, which may be, but is not necessarily, an inverted hemisphere in shape, lies adjacent to the inner wall of the tank and is joined thereto by a seal which comprises a compliant annular member located next to the tank inner wall, a preloaded pressure ring next to and inward of the compliant member, a shoulder flange formed on the periphery of the piston and a shear seal ring located in a recess formed between the entrance end of the tank body, the shoulder flange, the exit end of the pressure ring and the exit end of the entrance head of the tank.

Bonds are formed between the pressure ring and the piston, the shear seal ring and the piston, and the entrance head of the tank and both the shear seal ring and the outside of the tank body. These bonds prevent any leakage of the liquid propellant stored in the tank body. When the piston is pressurized, the piston is forced to move toward the exit end to compress the propellant fluid. The shear seal ruptures and allows the piston and seal to slide within the tank in response to the pressure. Resilient fingers on the pressure ring then exert outward force on the compliant annular member, pressing it firmly against the inner wall of the tank to seal the liquid propellant within the tank body despite movement of the piston.

OBJECTS OF THE INVENTION

A primary object of the invention is to provide a compliant sliding seal for a piston which is preloaded against the cylinder during the expulsion operation, but one in which the compliant member is retained in an unloaded condition during long-term storage to prevent creep or plastic flow.

Another object of the invention is to seal off the liquid propellant in a rocket engine fuel tank to prevent either internal or external leakage.

Another object is to provide a circumferential sliding seal for sealing the contact area between the circular periphery of a piston and the inner wall of a cylindrical tank used for holding a liquid.

A further object is to provide a seal for a piston in a liquid-containing tank, which will operate as a static seal during long storage periods and a dynamic seal when the piston is energized.

Other objects, advantages and novel features of the present invenion will become apparent from the following detailed description of the invention when considered in conjunction with the accompanying drawings.

BRIEF DESCRIPTION OF THE DRAWINGS

FIG. 2 is a cross-sectional view of an embodiment of the invention used on a cylindrical propellant, the cross-section being taken through a slot in the pressure ring.

FIG. 3 is a broken-away, top view of the pressure ring.

FIG. 4 is a cross-sectional view showing its structure in its normal condition before it is biased inward by contact with the compression ramp.

The same elements or parts throughout the figures of the drawings are designated by the same reference characters, while equivalent elements bear a prime designation.

DETAILED DESCRIPTION OF THE INVENTION

Figure 1:
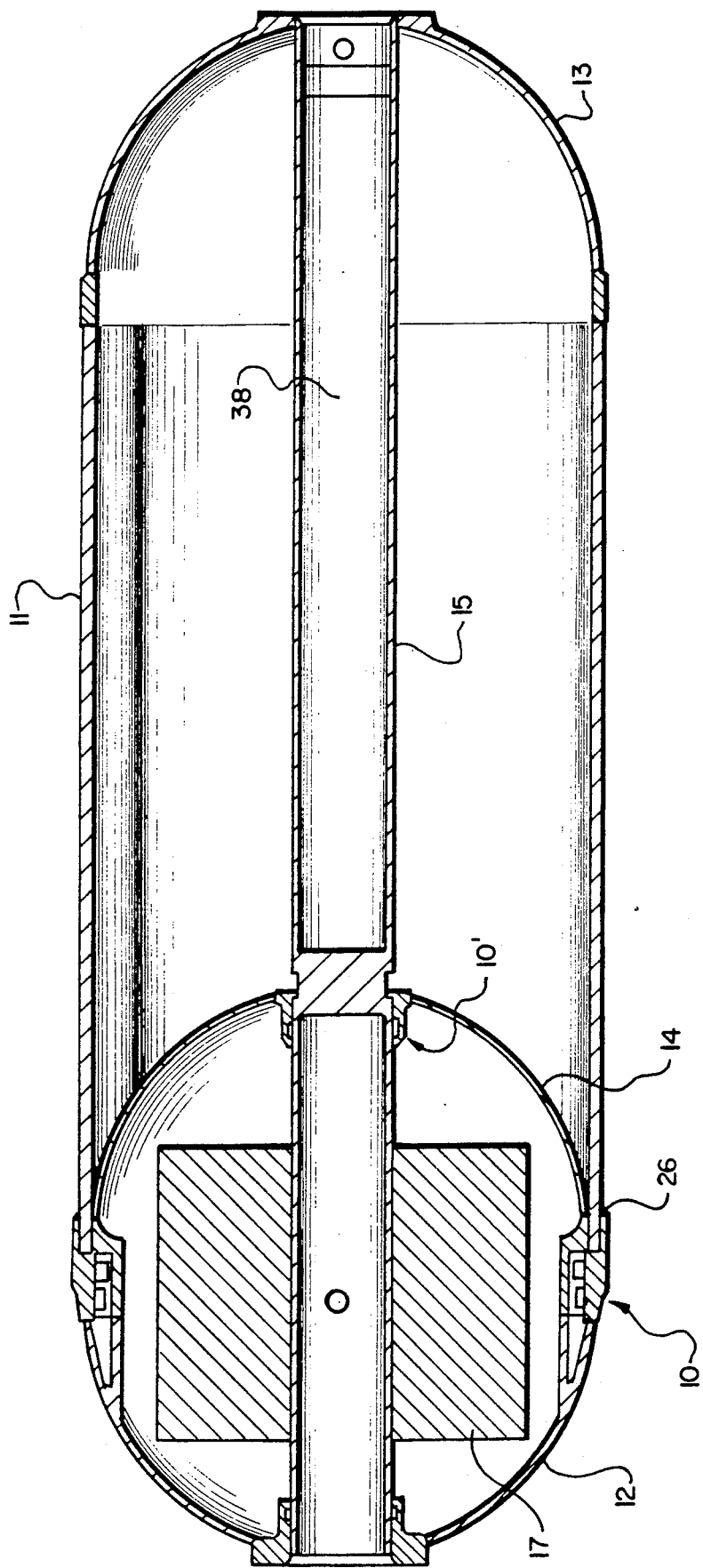
FIG. 1 is a schematic cross-sectional view of a cylindrical propellant tank for use with a rocket engine.

In connection with the description of the invention, certain words will be used relative to the fuel tank shown in FIG. 1 and will be defined as follows:

"inward" means in the direction from the tank walls toward the central axis of the tank;

"outward" means in the direction from the central axis toward the outer walls;

the "entrance end" of the tank refers to the left side of the Figure where the pressurant acts on the piston and/or entrance head, or cover, for the tank;

the "exit end" of the tank refers to the right side of the Figure from which the liquid propellant in the tank is expelled under pressure from the piston.

FIG. 1 illustrates in cross-sectional view a cylindrical-type of tank for storing liquid propellant used as fuel for a rocket engine. The tank has a cylindrical body 11, a hemispherical exit head 13 integral with the body 11, and a hemispherical entrance head 12 which is joined to the entrance end of the tank body 11 by a circumferential weld 26. A piston seal 10 is located inward of the tank body 11 and the entrance head 12. A piston guide shaft, or support tube, 15 extends through the center of the tank and is coaxial with the longitudinal axis of the tank. A piston 14, which may, for example, have the form of an inverted hemisphere (i.e., inverted with respect to the entrance-head hemisphere), is located within the tank body. The piston 14 is supported centrally by the support tube 15 to which it is joined by a slidable circumferential seal 10'. The piston 14 is circumferentially sealed to the entrance head 12 by a shear seal 32. (see FIG. 2) Piston seal 10' is similar in structure to seal 10.

FIG. 2 is a cross-sectional view of the seal 10 showing its structure in detail. The outer periphery of the piston 14 is formed with an annular shoulder member 16 comprising an inwardly extending shoulder 19 and a longitudinally extending shoulder flange 21. An annular, preloaded, biasing sealing ring, or pressure ring, 18 is placed between the flange 21 and the pressure ramp 22 which extends inwardly of the inner wall of the entrance head 12, forming a recess 44 next to the inner wall in which an annular ring of compliant material, called the compliant sealing ring 20, is placed. The compliant sealing ring 20 is bonded to the pressure ring 18 along its upper surface 41.

The pressure ring 18 has an outwardly extending section 23 which contacts the exit end of the compliant sealing ring 20, a flange-contact section 25 which is welded to the outer side of the flange 21, and a ramp-contact section 27 which is sloped to conform to, and is in contact with, a ramp 22 formed on the inner wall of the entrance head 12. A recess 51 is formed between the shoulder member 16 of the piston 14 and the pressure ring 18, in which recess an annular shear seal 32 is placed. The shear seal 32 is structurally sealed to the inner wall of the flange 21 of the shoulder member 16 of the piston 14 by a weld 28, for example. The inner wall of the flange 21 is also structurally sealed to the flange-contact section 25 of the pressure ring 18 by a weld 24, for example.

The exit end of the entrance head 12 is formed with an annular flange 42 extending over the juncture between the entrance head 12 and the tank body 11 and sealed circumferentially to the tank body 11 by a weld 26, for example, and to the shear seal 32 by a weld 29, for example. Bonding means other than welds may be employed.

The welds 28 and 29 prevents the liquid propellant inside the tank body 11 from entering the cavity inside the entrance head 12 and reacting with the chemicals of the pressurant, such as those of a solid propellant gas generator 17, or anything else which may be located therein. The outside weld 26 prevents the liquid propellant from leaking outside the tank body 11.

One or both of the mating surfaces of the compression ramp 22 and the pressure ring 18 may be coated with a synthetic resin polymer material, such as Teflon, to prevent cold bonding of the surfaces during the storage period which may be as much as ten years, or longer. The coating material should assist, or at least not hinder, the sliding of the mating surfaces over each other.

A space exists between the outer surface of the compliant ring 20 and the inner surface of the entrance head 12 (as can be seen in FIG. 2) since the preloading of the fingers 34 is prevented from forcing the compliant ring against the entrance head by contact of the pressure ramp 22 with the slope of the pressure ring 18.

FIG. 3, which is a partial, broken-away, plan view of the preloaded pressure ring 18, shows that the ring 18 comprises a series of longitudinal fingers 34 separated by slots 36 with a solid, circumferential, non-slotted section 52 extending longitudinally from the flange-contact section 25 toward the exit end of the pressure ring 18. In its normal unstressed condition, as seen in FIG. 4, the fingers 34, and therefore compliant seal 20, slope outwardly from the flange-contact section of the pressure ring 18. In other words, the fingers have surfaces which increase in diameter toward the entrance end relative to the fixed diameter of the circumferential band 52. However, when the entrance head 12 is fitted into place over the tank body 11, the compression ramp 22 forces the fingers 34 of the finger section of the pressure ring 18 and seal ring 20 inwards, straightening out the finger section of the ring 18, thereby inwardly preloading the compliant seal ring 20.

The piston 14 and the pressure ring 18 may be fabricated from metals, such as titanium 6Al-4V, aluminum, or stainless steel, for example. The fingers 34 of the pressure ring 18 should be resilient for reasons which will become apparent subsequently. The compliant sealing ring 20 is preferably fabricated from an elastomeric material, such as neoprene rubber, or even a material such as Teflon, which will provide a seal under pressure from the fingers 34 between the piston and the tank-body inner wall upon release of the piston. The shear seal 32 should be fabricated from a soft metal, such as annealed aluminum, for example. The notch 30 is used to permit precise location of the rupture outwards of the inner bore of the tank so that the bore-contacting surface of the softer compliant seal ring 20 is never scored by the ruptured section of the shear seal 32.

In operation, the solid propellant gas generator 17 (or other gas source) is activated and gas pressure builds up against the piston 14. This causes the longitudinally extending section 52 of the pressure ring 18 to exert pressure against the shear seal 32 which shears apart at the notch 30 portion which is located outwardly of the outside diameter of the compliant sealing ring 20. The ruptured end, or appendage, of the shear seal 32, which is inward of the notch 30, rolls into the shear-seal recess 51 formed by the overhanging section 52 of the pressure ring 18 as the seal 10 moves with the piston 14. Folding of the ruptured end of the shear seal 32 prevents scoring of the sliding, outward surface of the compliant ring 20. When the pressure ring 18 moves out of contact with the compression ramp 22, the fingers 34 deflect outwardly placing an outward pressure against the compliant sealing ring 20. This causes the ring 20 to make firm contact with the inner wall of the tank body 11 and to seal off the cavity in which the propellant is located as the piston 14 is propelled toward the exit head 13 of the fuel tank.

The seal comprising the invention can be considered to be a combination of a static seal and a dynamic seal. Before the piston 14 moves, the seal is a static seal which includes the shear seal 32, the head flange 42, and welds 28 and 29 between these components.

When the piston 14 breaks the shear seal 32 and starts to move, and the fingers press the compliant ring against the tank inner wall, a dynamic seal comes into existence and may be said to include the compliant sealing ring 20, the pressure ring 18, and especially its resilient fingers 34, the shoulder flange 16, and the weld 24 holding the pressure ring 18 affixed to the flange 21.

Thus, there has been described herein a novel sealing means between a sliding internal piston and the inner bore of a liquid propellant tank. The sealing means provides a dynamic seal against leakage of the liquid from the tank to the cavity defined by the piston and the entrance head of the tank. A static seal is also provided, but is easily broken, when desired, to allow the piston to slide within the tank to provide positive expulsion of the liquid propellant therefrom.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An annular sliding seal for sealing the space between an inner wall of a tank for holding a liquid and an adjacent circular periphery of an internal piston for expelling the liquid therefrom, said tank having a cylindrical body, an entrance head for closing an entrance end of the cylindrical body and an exit end from which the liquid is expelled, said seal comprising:
   a head flange formed on the entrance head and extending toward the exit end of the tank to enclose an outer wall of the tank at its entrance end, the flange being bonded to said outer wall;
   a shoulder member formed on the periphery of said piston and extending inwardly thereof, said shoulder member having a longitudinally extending shoulder flange;
   a compression ramp formed on and extending inwardly from an inner surface of the entrance head and spaced from a juncture between the entrance head and the cylindrical body;
   a pressure ring located outwardly of said shoulder flange and bonded thereto, said pressure ring having a slope at one end which conforms to and rests upon the compression ramp when the entrance head is fitted to the cylindrical body, said pressure ring forming a first recess with the entrance head and a second recess with the shoulder flange, the entrance end of the tank and the entrance head, the pressure ring being fabricated from resilient material and having an inward pressure exerted on it by the compression ramp, the resilience of the pressure ring exerting an outward pressure against the ramp;
   a sealing ring made of compliant material and located within the first recess; and
   an annular shear seal located in the second recess, wherein, when said piston is pressurized and caused to slide, the shear seal ruptures, and the pressure ring slides off the compression ramp and exerts outward pressure against the compliant ring so that it forms an annular sealing contact with the inner wall of the tank throughout the movement of the piston.

2. A sliding seal as defined in claim 1, wherein the shear seal is formed from a soft material.

3. A sliding seal as in claim 1, wherein:
   said pressure ring also forms, with the entrance head, a third recess into which the outward end of the shear seal, after its rupture, folds so that scoring of the sealing ring by the ruptured end of the shear seal is prevented.

4. A sliding seal as defined in claim 1, wherein the shear seal is bonded to the shoulder member.

5. A sliding seal as defined in claim 1, wherein the shear seal is bonded to the head flange.

6. A sliding seal as defined in claim 1, wherein the shear seal is notched for easy rupture at a precise location.

7. A sliding seal as defined in claim 1, wherein the shear seal is notched at a location thereon outward of the inner wall of the cylindrical body.

8. A sliding seal as defined in claim 1, wherein the pressure ring is formed with fingers extending longitudinally of a non-slotted circumferential section, the finger section sloping outward from the non-slotted section in the normal unstressed condition of the pressure ring.

9. A sliding seal as defined in claim 1, wherein the pressure ring is preloaded by the compression ramp so that the ring does not exert pressure against the compliant sealing ring while the pressure ring rests against the ramp.

10. A sliding seal as defined in claim 1, wherein at least one of the mating surfaces of the compression ramp and the pressure ring is coated with a material which prevents cold bonding of the mating surfaces.

11. A sliding seal as defined in claim 1, wherein the shoulder member has a shoulder section extending inwardly from the periphery of the piston and a flange section on the inward end of the shoulder section extending longitudinally toward the entrance end of the tank.

12. A sliding seal as defined in claim 11, wherein the shear seal is bonded to said flange section of the shoulder member.

13. A sliding seal as defined in claim 11, wherein the pressure ring is bonded to the flange section of the shoulder member.

14. A sliding seal as defined in claim 1, wherein the pressure ring and the shoulder member are fabricated from titanium 6AL-4V.

15. A sliding seal as defined in claim 1, wherein the compliant sealing ring is fabricated from an elastomeric material.

16. A sliding seal as defined in claim 1, wherein the compliant sealing ring is fabricated from Teflon.

17. A sliding seal as defined in claim 1, wherein the shear seal is formed from soft, annealed aluminum.

18. A sliding seal as in claim 1, wherein said sealing ring is bonded to said pressure ring.

19. In a cylindrical tank having an entrance head fitting on an entrance end of the tank and a slidable internal piston having a circular periphery circumferentially abutting an inner wall of the tank, a sliding annular seal comprising:
   first means for effecting a static seal between the piston periphery, the entrance end of the tank, and an exit end of the entrance head; and
   second means for effecting a dynamic seal between the piston periphery and the inner wall of the tank and interacting with said first means when the piston is set in motion, said second means including:
   a compliant sealing ring, and
   a pressure ring in contact with said compliant sealing ring, said pressure ring including a finger section having resilient fingers extending longitudinally in the entrance head direction from a band section which has band of unslotted material, the finger section sloping outwards from the band section in the normal, unstressed condition of the pressure ring;
   a sloping compression ramp extending inwards from the inner surface of the entrance head;
   a slope at the entrance end of the pressure ring, which slope conforms to and rests upon the compression ramp, so that the compression ramp exerts an inward force on the resilient fingers of the pressure ring whereby the outward normal slope of the fingers is reduced as long as the pressure ring rests on the compression ramp;
   wherein, when the piston moves along the inner wall of the tank, said pressure ring applies outward pressure on said sealing ring thereby keeping the sealing ring in sealing contact with the inner wall of the tank.

20. A seal as defined in claim 19, wherein:
said entrance head is formed with an annular head flange extending toward the exit end of the tank and encircling the outer wall of the tank at its entrance end; and
said first means includes:
shoulder flange means affixed to and extending inwardly of the periphery of the piston and forming a recess with the pressure ring, the head flange and the entrance end of the tank; and
means for bonding said pressure ring to said shoulder flange means.

21. A seal as defined in claim 20, wherein said first means further includes shear seal means located in said recess, extending between and bonded to said shoulder flange means and said head flange.

22. A seal as defined in claim 20, wherein said shear seal means is formed from a soft, rupturable, liquid-impervious material.

23. A seal as defined in claim 20, wherein said shear seal means is notched at a location outward of the compliant pressure ring.

24. A dynamic seal for sealing the juncture between the periphery of a circular piston and the inner wall of a cylindrical body which the piston periphery abuts and along which the piston may slide, said body having an entrance head for fitting on and closing an entrance end of said body, said dynamic seal comprising:
a compliant seal ring adjacent to said inner wall; and
a pressure ring including a section having resilient fingers extending longitudinally in the entrance head direction from a region of unslotted material, the finger section sloping outwards from the unslotted region in the normal, unstressed condition of the pressure ring and structured to apply pressure to said compliant ring when the latter slides along the inner wall to force the compliant ring into sealing contact with the inner wall,
said pressure ring being affixed to the piston for movement therewith and said compliant ring being moved by and in conformity with said pressure ring,
the entrance head being formed with a sloping compression ramp extending inwards from the inner surface of the entrance head; and
the pressure ring being formed with a slope at its entrance end, which slope conforms to and rests upon the compression ramp, so that the compression ramp exerts an inward force on the resilient fingers whereby the normal outward slope of the fingers is reduced as long as the pressure ring rests on the compression ramp.

25. A dynamic seal as in claim 24, wherein said seal ring is bonded to said pressure ring.

* * * * *